(12) United States Patent
Tiao (10) Patent No.: US 7,210,571 B2
(45) Date of Patent: May 1, 2007

(54) FILM CONVEYING MECHANISM

(75) Inventor: Jung-Mao Tiao, Taipei Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 66 days.

(21) Appl. No.: 10/906,658

(22) Filed: Mar. 1, 2005

(65) Prior Publication Data

US 2006/0201786 A1  Sep. 14, 2006

(51) Int. Cl.
- B65G 15/00 (2006.01)
- B65G 15/14 (2006.01)
- B65G 37/00 (2006.01)
- B65G 15/10 (2006.01)

(52) U.S. Cl. ............... 198/626.1; 198/817; 198/604

(58) Field of Classification Search ............ 198/626.6, 198/817, 604, 626.3, 626.4, 626.5, 419.1, 198/464.1, 437, 432, 426, 418.7, 626.1
See application file for complete search history.

(56) References Cited

U.S. PATENT DOCUMENTS

| | | | | |
|---|---|---|---|---|
| 5,755,073 A | * | 5/1998 | Moncreif et al. ............ 53/48.1 |
| 6,595,348 B1 | * | 7/2003 | Grasswill et al. ........... 198/604 |
| 6,629,595 B2 | * | 10/2003 | Wiese et al. ................. 198/817 |
| 6,769,534 B2 | * | 8/2004 | Lee ............................. 198/817 |
| 7,036,656 B2 | * | 5/2006 | Gariglio ................... 198/689.1 |
| 2002/0005336 A1 | * | 1/2002 | Rehm ..................... 198/803.11 |
| 2005/0109588 A1 | * | 5/2005 | Gariglio ..................... 198/817 |

* cited by examiner

Primary Examiner—Gene O. Crawford
Assistant Examiner—Ramya G. Prakasam
(74) Attorney, Agent, or Firm—Winston Hsu (57) ABSTRACT

A film conveying mechanism comprises a base, a belt capable of conveying the films, a spring plate, a fixing pin, and a stopper. The spring plate includes an opening on a second end and is longitudinally disposed with respect to the belt. The fixing pin is on the base and holds a first end of the spring plate. The stopper, which is narrower than the opening, protrudes through the opening and limits the movement of the second end of the spring plate in a first direction. The stopper restricts the lateral and longitudinal horizontal movement of the spring plate, allowing the spring plate some retraction or expansion space according to the amount of belt pressure. Using the stopper reduces film jams, makes the spring plate longer lasting, and keeps the film conveying mechanism running efficiently regardless of possible wear and tear or minor manufacturing defects in the spring plate.

15 Claims, 7 Drawing Sheets

FILM CONVEYING MECHANISM

BACKGROUND OF INVENTION

1. Field of the Invention

The present invention relates to a film conveying mechanism, and more specifically, to a film conveying mechanism containing a conveyor spring plate fixed at one end and free standing at the other end.

2. Description of the Prior Art

Due to the complexity of filming devices (such as cameras), many of these contain a plethora of semi-independent components. A majority of both modern and traditional filming devices include an essential component known as a film conveying mechanism, whose main task is to advance the film from one region of the filming device to another.

Figure 1:
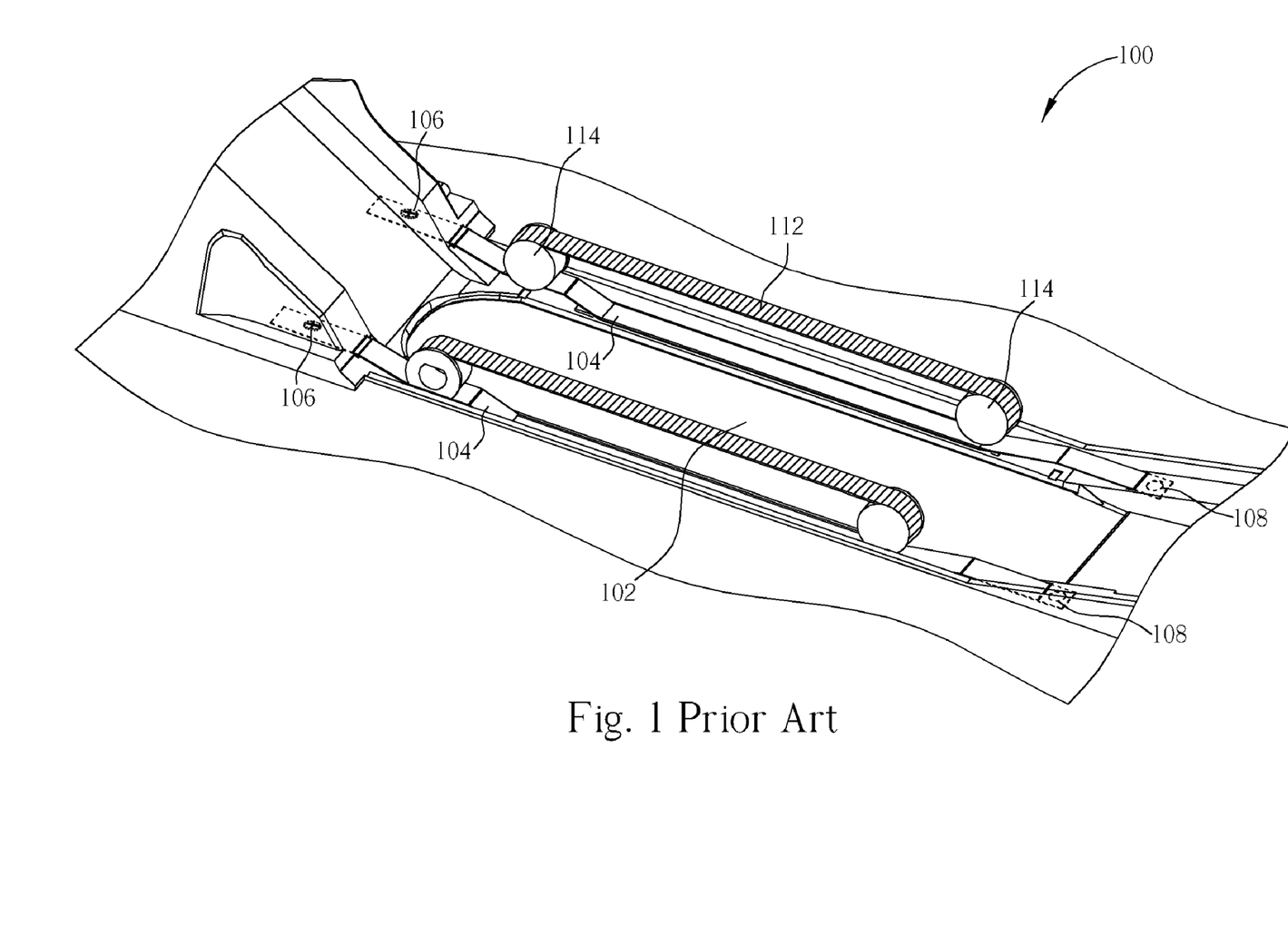
FIG. 1 is a perspective view of a prior art film conveying mechanism.

Please refer to FIG. 1 where a film conveying mechanism 100 is illustrated. The film conveying mechanism 100 comprises a base 102, a belt 112, rollers 114 and a spring plate 104, which is held in place at one end by a fixing pin 108 and securely fixed at the other end by a screw 106. The lower surface of spring plate 104 lies on top of a spring plate track 110 (not shown in FIG. 1), while the upper surface of the spring plate 104 makes contact with the belt 112 when there is no film loaded. When there is a film loaded, the film is located between the belt 112 and the spring plate 104, and is driven to move in the right to left direction by the belt 112. The belt 112, which is driven by the rollers 114, pushes downward on the spring plate 104 with a certain amount of pressure.

Figure 2:
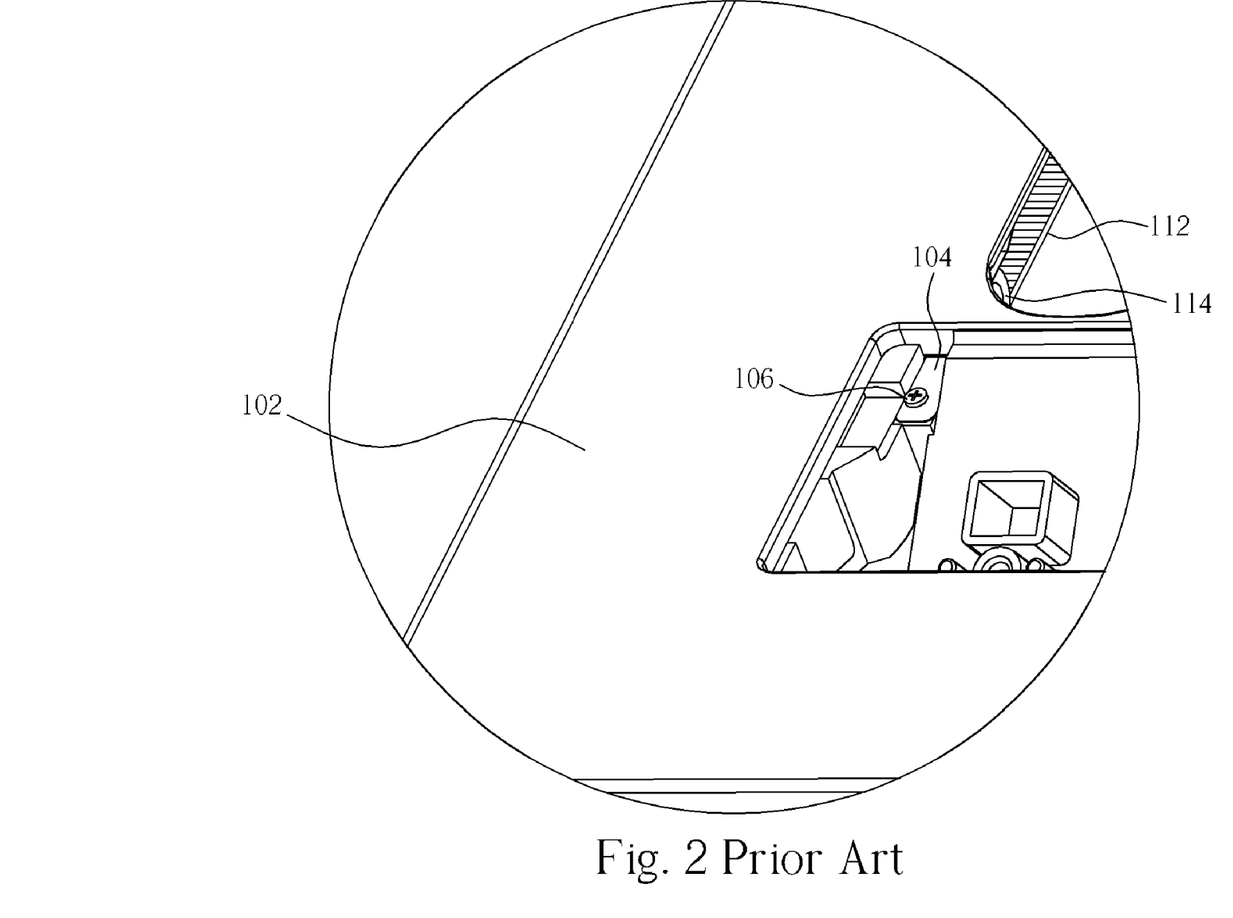
FIG. 2 is a magnified localized perspective view of the underside of the prior art film conveying mechanism in FIG. 1.

Please refer to FIG. 2 where a localized underside view of the film conveying mechanism 100 is displayed. On the lower side of the base 102, the screw 106 secures the spring plate 104 to the base 102, while on the base's 102 upper side one of the rollers 114 and the belt 112 can be seen.

Figure 3:
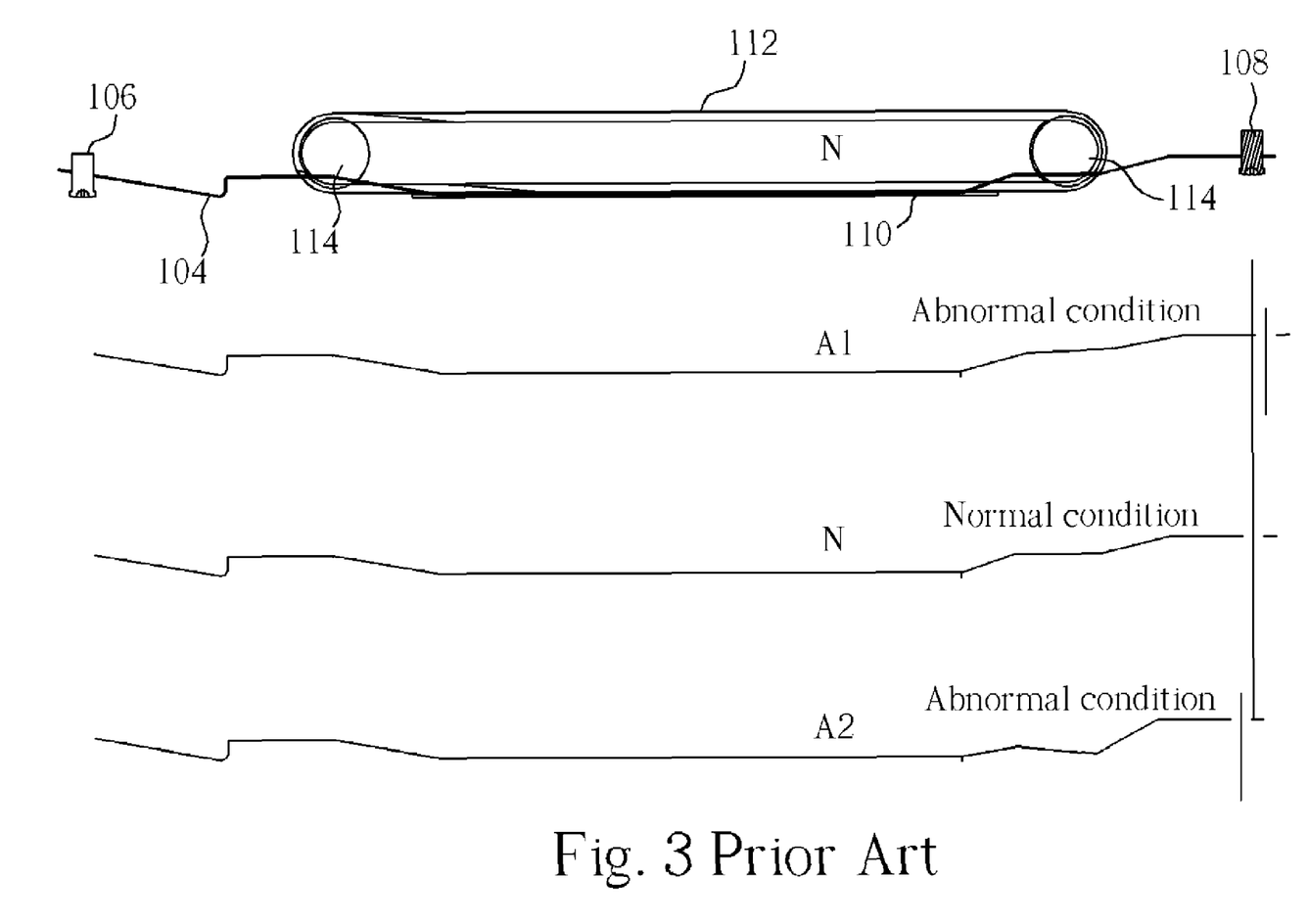
FIG. 3 is a diagram illustrating normal/abnormal operating shapes of a spring plate of the prior art film conveying mechanism in FIG. 1.

Please refer to FIG. 3 in conjunction with FIG. 1. Here, the spring plate 104 and belt 112 are illustrated by means of a two dimensional view. The belt 112 pushes with a certain amount of pressure against the spring plate 104 generating sufficient friction to make sure that the film is advanced smoothly and accurately. For a variety of reasons, discussed below, the spring plate can come to be pushed either too lightly or too strongly by the belt, causing the spring plate to become deformed over time. Scenario A1 shows the spring being deformed by too much pressure, A2 shows the spring plate deformed by too little pressure and N represents the ideal situation when the pressure is just right.

Unfortunately, the prior art's film loader spring plate has a serious drawback. Having the right kind of pressure between the spring plate and the belt can be difficult to achieve. The manufacturing process, as well as natural wear and tear of the film loader, can leave the spring plate bent in certain conditions, such as those described above. Having the spring plate bent in an abnormal shape is undesirable for a multitude of reasons. First of all, there is an increased probability of film jam occurring. Secondly, the spring plate will break down easily, especially in the case when the pressure between the belt and spring plate is too great. Thirdly, attempts to ensure that the spring plate is constructed perfectly at manufacture time will probably see the cost of manufacturing rise. Finally, and maybe most importantly, abnormal spring plate shape could cause loss of precision and accuracy in the film conveying mechanism, and as a result affect negatively the operation of the filming device as a whole. For instance, blurriness of pictures can be one of these adverse effects.

SUMMARY OF INVENTION

It is therefore a primary objective of the claimed invention to provide a film conveying mechanism that solves the above-mentioned problems of the prior art.

According to the claimed invention, a film conveying mechanism comprises a base, a belt capable of conveying the films, a spring plate, a fixing pin, and a stopper. The spring plate includes an opening on a second end and is longitudinally disposed with respect to the belt. The fixing pin is on the base and holds a first end of the spring plate. The stopper, which is narrower than the opening, protrudes through the opening and limits the movement of the second end of the spring plate in a first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
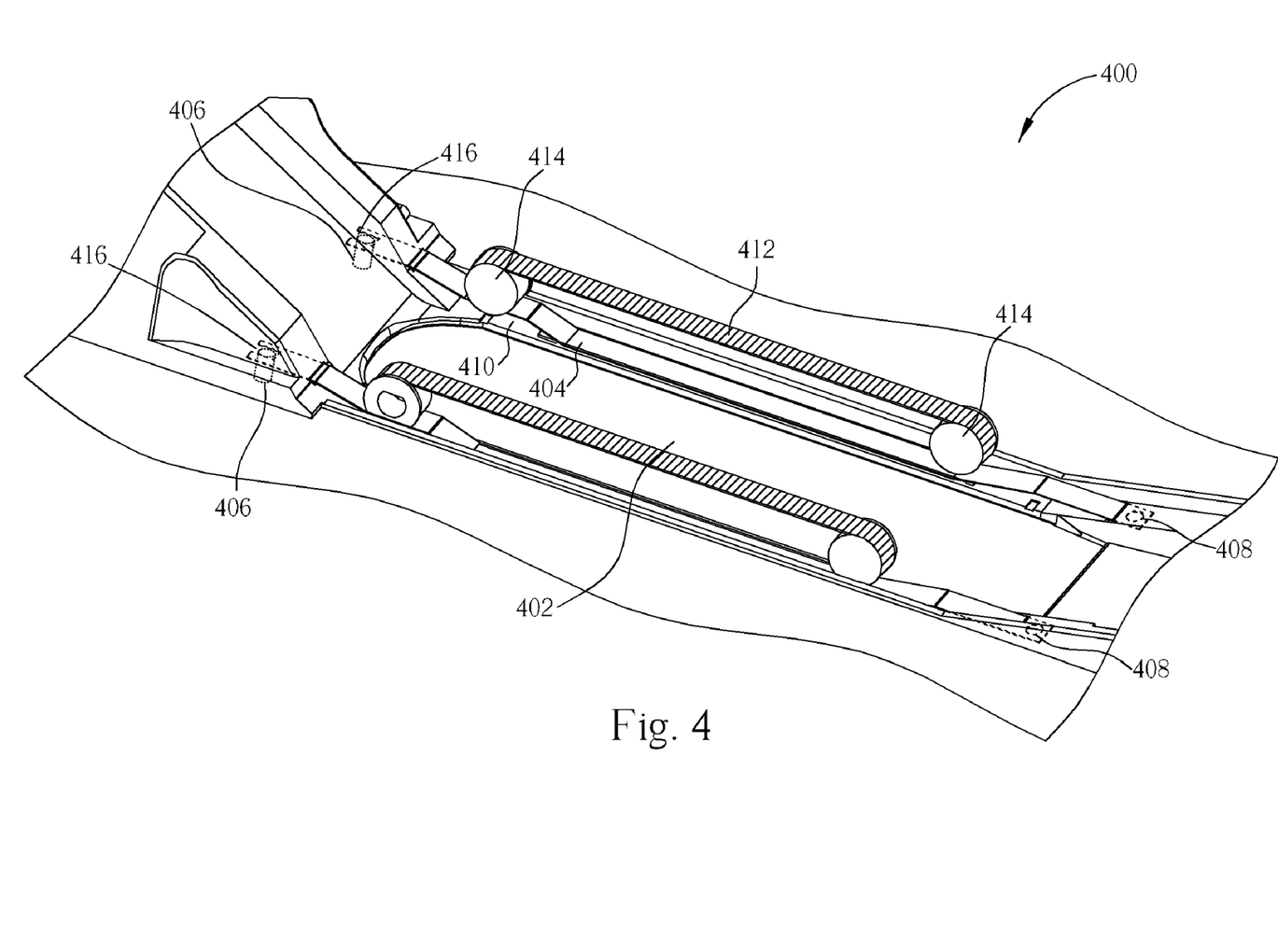
FIG. 4 is a perspective view of a film conveying mechanism according to the present invention.

Please refer to FIG. 4 where a film conveying mechanism 400, according to the present invention, is shown. The film conveying mechanism 400 can be used in devices requiring film, such as cameras of many kinds (still, video, etc) and film scanners. The film conveying mechanism 400 comprises a base 402, a belt 412, a spring plate 404, a spring plate track 410 (not shown in FIG. 4), a fixing pin 408, and a stopper 406. The belt 412 comprises a set of rollers 414 that drive the belt 412. The belt 412 pushes with downward pressure on the spring plate 404. The movement of the belt 412 causes the film to advance between the belt 412 and spring plate 404 by way of friction. The spring plate 404 runs parallel to one face of the belt 412 and is held at a first end to the base 402 by the fixing pin 408, which is fixed to the base 402. A second end of the spring plate 404 includes an opening 416. The stopper 406 is connected to the base 402, and serves to limit the lateral and longitudinal movement of the spring plate 404 to a certain degree, by protruding through the spring plate's 404 opening 416. The stopper 406 is narrower than the opening 416, the stopper 406 accordingly allowing for a limited movement of the spring plate 404 in a first plane. In this case, the first plane is the horizontal plane. The opening 416 can be forked-shaped, allowing further freedom of movement of the spring plate 404 and easier assembly or disassembly. Additionally, the spring plate 404 can be irregularly shaped in the vertical direction and the spring plate's 404 first and second ends can be curved upwards permitting more pressure to be contained between the belt 412 and the spring plate 404. The spring plate 404 can be made from a flexible material such as steel or from a rigid material such as plastic.

Figure 5:
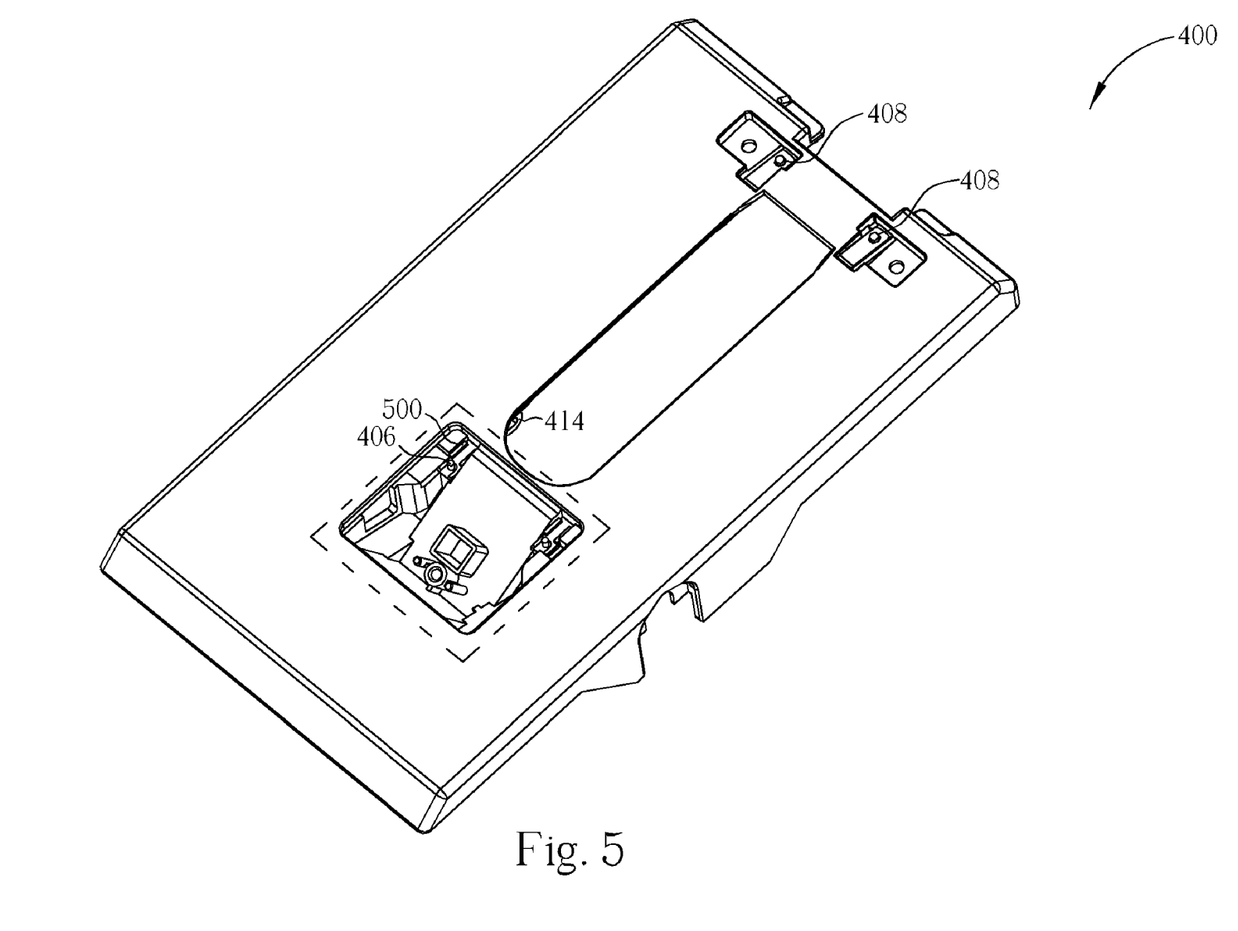
FIG. 5 is a perspective view of the underside of the film conveying mechanism in FIG. 4.
Figure 6:
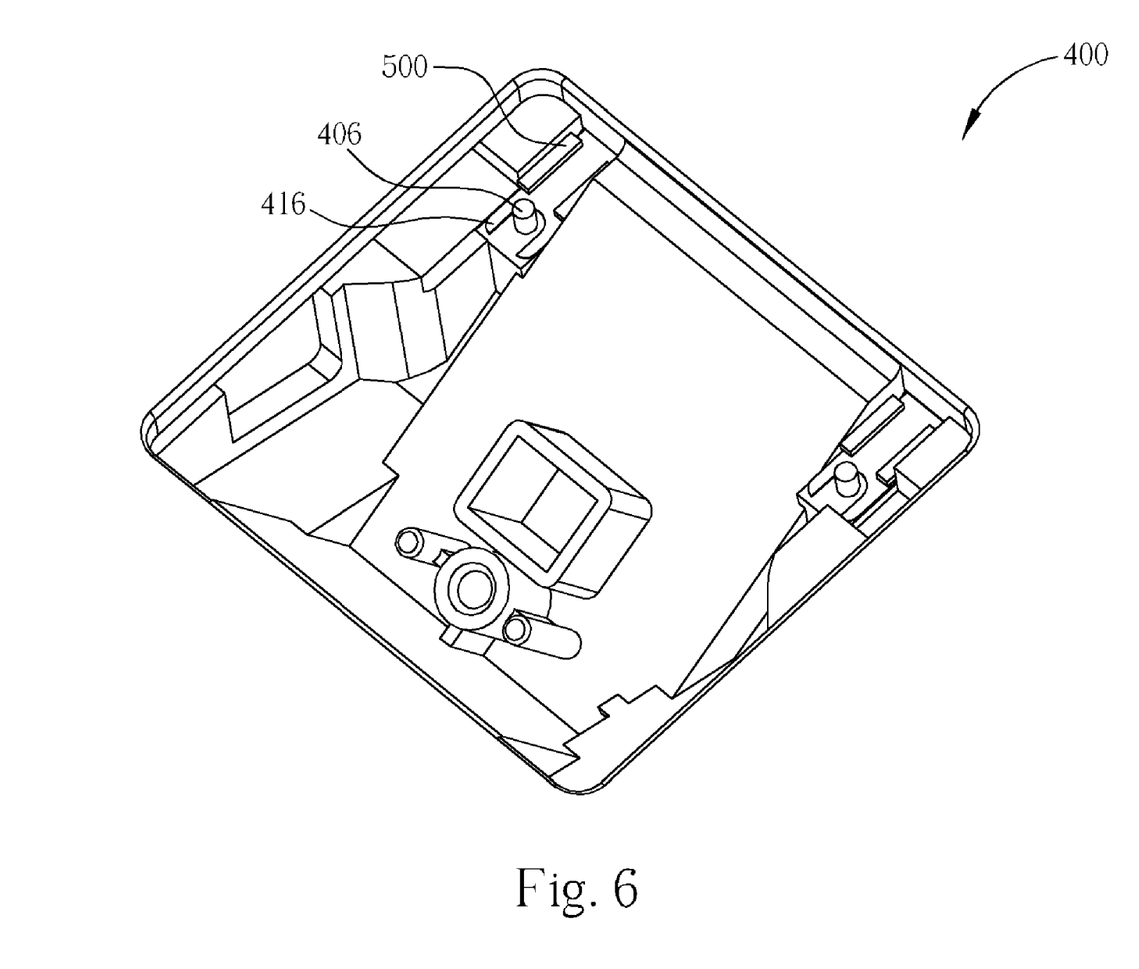
FIG. 6 is a magnified perspective view of the dashed region of the film conveying mechanism in FIG. 5.

Please refer to FIGS. 5 and 6 in conjunction with FIG. 4. This underside view of the film conveying mechanism 400, illustrates the film conveying mechanism 400 also including a shelter rim 500. The shelter rim 500 serves as a barrier, which together with the base 402, sandwiches the spring plate 404 and in doing so restricts the movement of the spring plate 404 in a second direction (or plane). In this case, the second direction is the vertical direction. The shelter rim could be in the form of a continuous edge or in the form of one or more protrusions, all serving the purpose of limiting the movement of the spring plate 404 in the second direction.

Figure 7:
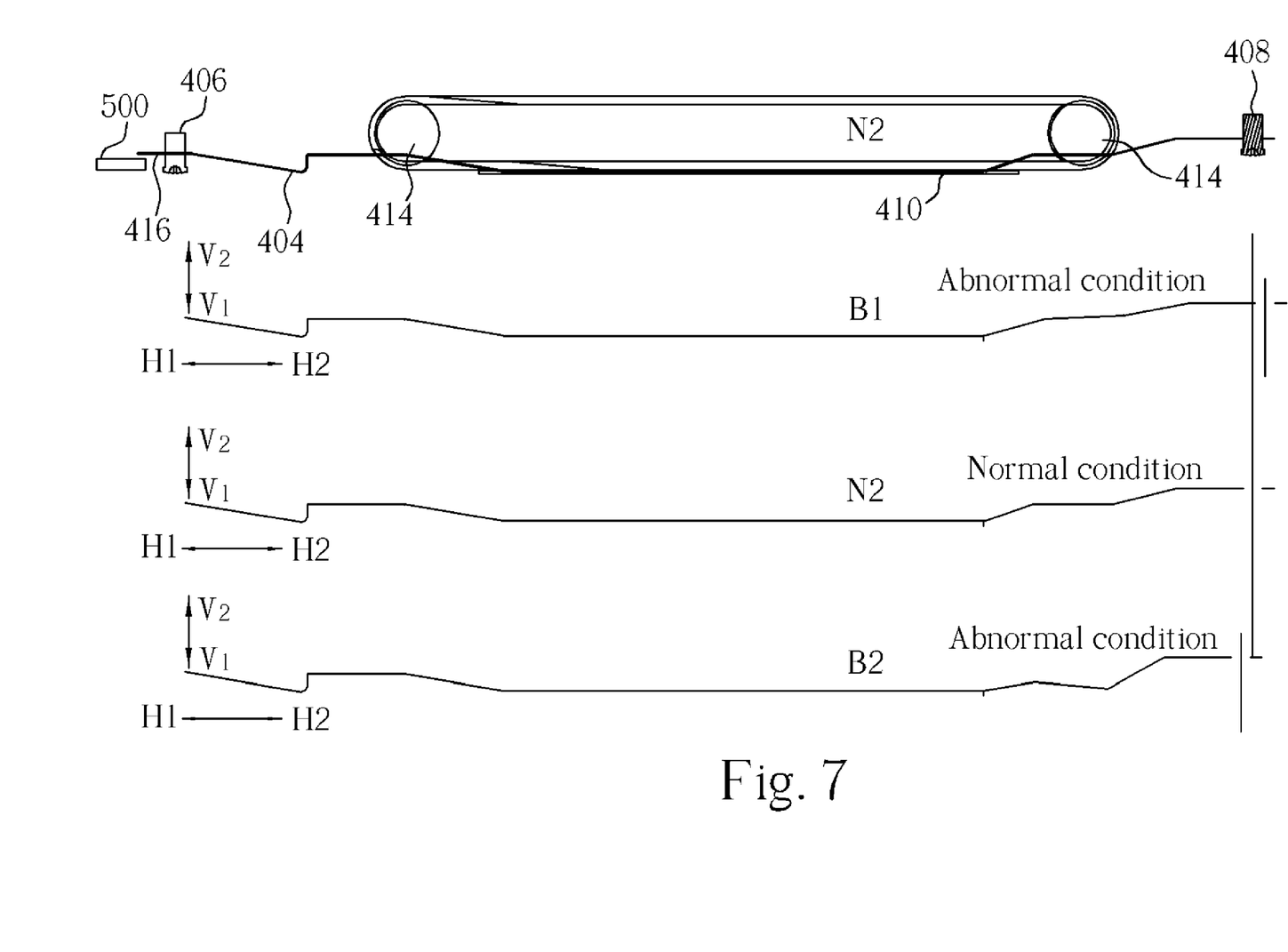
FIG. 7 is a diagram illustrating normal/abnormal operating shapes of the spring plate of the film conveying mechanism in FIG. 4.

Please refer to FIG. 7 in conjunction with FIGS. 4 and 5. Here, a two dimensional view of the spring plate 404 is shown. As previously explained, unlike the prior art spring plate 104, shown in FIG. 3, the spring plate 404 is limited in movement by the stopper 406 and the shelter rim 500.

The situation when the belt 412 pushes the spring plate too strongly is shown as scenario B1, while scenario B2 illustrates the shape of the spring plate when the pressure coming from the belt 412 is too small. Both B1 and B2 represent scenarios in which the spring plate 404 is being forced into abnormal shapes. Scenario N2 illustrates the ideal situation, when the pressure between the belt 412 and the spring plate 404 is at the desirable level.

The symbols V1 and V2 are used to indicate the direction and the vertical range that the spring plate 404 has with respect to, and allowed by, the shelter rim 500. The symbols H1 and H2 illustrates the direction and the horizontal range that the spring plate 404 has with respect to, and allowed by, the stopper 406.

The main cause of abnormal spring plate shapes is strain on the structural integrity of the plate alimented by the pressure, or lack thereof, provided by the belt. This problem was exacerbated in the prior art by fastening both ends of the spring plate to the base. On the other hand, by implementing the stopper 406 and the shelter rim 500 to serve as breathing space for the spring plate 404, the present invention reduces the probability that the spring plate 404 bends into an abnormal shape such as B1 or B2.

Despite that the present invention's spring plate 404 can better retain a desirable shape thanks to the belt pressure being relieved by the stopper 406 and the shelter rim 500, the occurrence of abnormal spring plate shapes is still possible (although much less likely than in the prior art). The spring plate 404 can be in an abnormal shape as a result of flawed manufacturing or due to wear and tear of the spring plate 404 over time.

Fortunately, the present invention is also capable of handling manufacturing defects and wear and tear situations appropriately. Even though as a result of manufacturing the spring plate 404 could be abnormally bent, the film conveying mechanism 400 can still operate accurately due to the partial lateral and longitudinal mobility of the spring plate's second end (having opening 416) which causes the spring plate 404 to remain in the position determined by the pressure coming from the belt 412.

For example, too much downward pressure on the spring plate 404 from the belt 412 can cause the spring plate 404 to bend downwards, and concurrently, the second end of the spring plate to move vertically upwards in the V1 to V2 direction, and horizontally from left to right, in the H1 to H2 direction.

Conversely, too little downward pressure on the spring plate 404 from the belt 412 can relieve the burden on the spring plate allowing it to expand naturally upwards as dictated by its shape and constructive material. This can cause the second end of the spring plate 404 to move vertically downwards in the V2 to V1 direction, and horizontally from right to left, in the H2 to H1 direction.

Consequently, the spring plate 404 is able to go on functioning accurately for a long time, regardless of any manufacturing defects or deterioration in its shape.

Additionally, film jams can be eliminated, as the right balance of pressure between the belt/spring plate facilitated by the stopper block/shelter rim keep the film conveying mechanism working efficiently. The right amount of pressure keeps the film advancing smoothly and manageably between the spring plate and the belt.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A film conveying mechanism comprising:
   a base;
   a belt capable of conveying the film;
   a spring plate being fixed at a first end and having an opening on a second end, and being flatly disposed between the base and one face of the belt; and
   a stopper connected to the base protruding through the opening, the stopper being narrower than the opening and limiting movement of the second end of the spring plate in a first direction.

2. The film conveying mechanism of claim 1 further comprising a shelter rim sandwiching the spring plate with the base, and limiting movement of the second end of the spring plate in a second direction that is substantially perpendicular to the first direction and substantially perpendicular to a plane formed by the base.

3. The film conveying mechanism of claim 2 wherein the spring plate is located on a spring plate track of the base.

4. The film conveying mechanism of claim 3 wherein the spring track restricts the vertical movement of the second end of the spring plate.

5. The film conveying mechanism of claim 2 wherein the shelter rim comprises a protrusion.

6. The film conveying mechanism of claim 2 wherein the shelter rim comprises a continuous edge.

7. The film conveying mechanism of claim 2 wherein the opening of the second end of the spring plate is fork-shaped.

8. The film conveying mechanism of claim 2 wherein the spring plate is irregularly shaped in the vertical direction.

9. The film conveying mechanism of claim 2 wherein the first and second ends of spring plate are curved upwards away from the base.

10. The film conveying mechanism of claim 2 wherein the spring plate is made of a rigid material.

11. The film conveying mechanism of claim 2 wherein the spring plate is made of a flexible material.

12. The film conveying mechanism of claim 2 wherein the belt pushes against the spring plate.

13. The film conveying mechanism of claim 2 wherein the stopper restricts the movement of the second end of the spring plate in the first direction.

14. The film conveying mechanism of claim 2 wherein the stopper block restricts the movement of the second end of the spring plate in the second direction.

15. A film conveying mechanism comprising:
  a base;
  a belt capable of conveying the film;
  a spring plate having an opening on a second end and flatly disposed between the base and one face of the belt;
  a fixing pin on the base, holding a first end of the spring plate;
  a stopper connected to the base protruding through the opening, the stopper being narrower than the opening and limiting movement of the second end of the spring plate in a first direction; and
  a continuous shelter rim sandwiching the spring plate with the base, and limiting movement of the second end of the spring plate in a second direction that is substantially perpendicular to the first direction and substantially perpendicular to a plane formed by the base;
  wherein the spring plate is located on a spring plate track of the base and the spring track restricts the movement of the second end of the spring plate in the second direction.

* * * * *